(No Model.)
E. F. TAYLOR.
GLEANER ATTACHMENT FOR REAPERS AND BINDERS.
No. 459,217.  Patented Sept. 8, 1891.
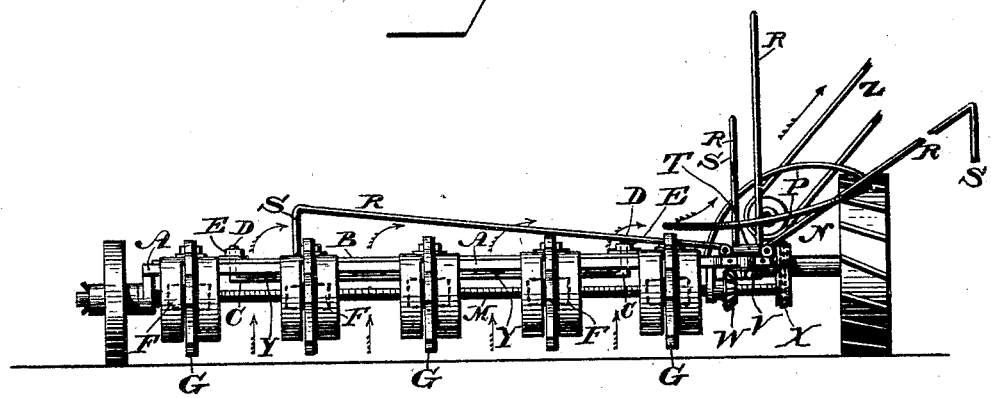
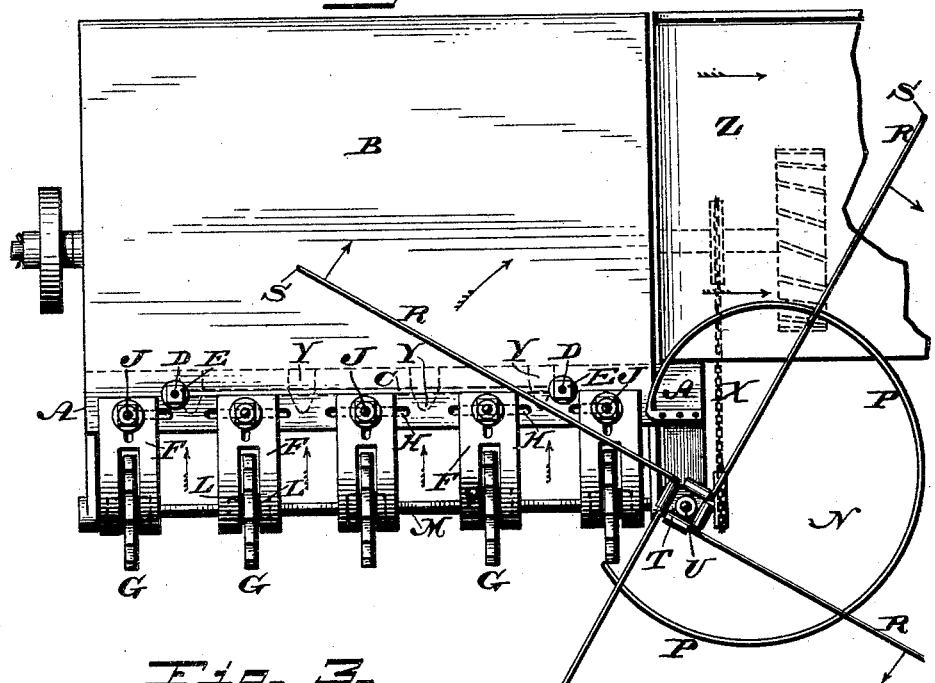

UNITED STATES PATENT OFFICE.

EDWIN F. TAYLOR, OF FURLONG, PENNSYLVANIA.

GLEANER ATTACHMENT FOR REAPERS AND BINDERS.

SPECIFICATION forming part of Letters Patent No. 459,217, dated September 8, 1891.

Application filed November 11, 1890. Serial No. 371,052. (No model.)

*To all whom it may concern:*

Be it known that I, EDWIN F. TAYLOR, a citizen of the United States, residing at Furlong, in the county of Bucks, State of Pennsylvania, have invented a new and useful Improvement in Gleaner Attachments for Reapers and Binders, which improvement is fully set forth in the following specification and accompanying drawings.

My invention consists of a gleaner attachment for a reaper and binder constructed as hereinafter described.

Figure 1 represents a front view of a gleaner attachment embodying my invention, the same being secured to a reaper and binder. Fig. 2 represents a top or plan view of the parts shown in Fig. 1. Fig. 3 represents a side view of a detail part of the device.

Similar letters of reference indicate corresponding parts in the several figures.

Referring to the drawings, A designates a bar or beam, to which is attached a table B, the latter being adapted to rest on the bed of a reaper or binder, so that the said bar A, which carries the remaining parts of the mechanism of the device, can be attached to the said reaper and binder.

C designates a clamping-bar having bent end portions D, which pass through openings in the beam and have screw-threaded upper ends on which the nuts E operate.

Secured to the bar A are the bearings F for the gatherers or gleaners G, the said bearings being composed of pieces or castings, which are adjustable on the said bar by means of the slots H in the bar and the bolts J, the stems of the latter passing through openings in said bearings and in said slots of the bar and their heads bearing on the castings.

The gleaners G are each composed of a wheel having projecting arms K with pointed ends adapted to lift the stalks from the ground and carry them on the rotation of the wheel, so as to deposit them on the table B. The said wheels are provided with hubs or axles L, extending on both sides thereof and rotating in the bearings F. An angular shaft or bar M passes through a central opening in the said wheels, thereby connecting them, so that they will be operated together.

N designates a rake mechanism consisting of a track formed of a cam or inclined way on which the pivoted arms R travel, each of the said arms having at its outer end a downwardly-bent portion S, adapted to engage one end of the stalks, so as to turn the same on the table B. The inner ends of the arms R are pivotally secured to a rotary frame T, so as to be raised or lowered according to their position on the tracks P. The frame T is secured to a vertical shaft U, which carries a bevel-wheel V, gearing with a bevel-wheel W on the shaft M, so as to rotate therewith, the said shaft M being operated by a chain X, connected with the running-gear of the reaper or binder.

In securing the device to a reaper and binder the knives or cutters of the latter are first removed and the bar A is placed on the edge of the table thereof, and the ends of the clamping-bar C are passed through openings in the bar A, the main portion of said bar being below and in contact with the guards Y of the reaper. As the nuts E are screwed on the ends of the clamp C the main part of the bar is moved so as to tightly clasp the guards Y, and thereby fasten the attachment securely to the machine. The stalks of grain which are on the ground and parallel with the bar A are raised by contact with the rotating gleaners G, so as to be deposited on the table B parallel and adjacent to the bar A, where the depending portion S of an arm R comes in contact with one end of the same, and as the arm R is rotated carries or swings that end of the stalks through a space equal to a quarter of a circle, the other end remaining at rest. This action places the stalks in proper condition to ascend the apron Z to the binder.

It will be seen that the device is readily adapted to be secured to a reaper and binder by merely taking off the knives of the latter, and that it will efficiently perform the work required. By making the bearings F adjustable on the bar A the attachment can be adapted to either short or long stalks. The device is especially suitable and useful in case of oats, which when cut are usually not in condition for binding, and therefore are cut by a reaper and left on the ground unbound.

Having thus described my invention, what I claim as new, and desire to secure by Letters Patent, is—

1. The combination of a bar with a table, a rotating shaft with gleaners secured thereto, and a rake for turning the gathered stalks, substantially as described.

2. The combination of a supporting-bar, a rotary shaft, bearing-pieces connected with said bar, gleaners on said rotary shaft and having journals in said bearings, a track, and arms moving on said track, said arms having depending outer ends, substantially as described.

3. A supporting-bar, bearing-pieces connected with said bar, gleaners having hubs journaled in said bearings, a connecting-shaft for said gleaners, a rotating frame with arms pivoted thereto, and an inclined trackway for said arms, the said arms having depending portions, said parts being combined substantially as described.

4. A gleaner attachment for a reaper and binder, consisting of a bar with a table, bearing-pieces connected with said bar, gleaners having journals in said bearings, a connecting-shaft for said gleaners, a rake with an inclined way, and mechanism, substantially as described, for rotating said shaft and said rake, said parts being combined substantially as described.

5. A gleaner attachment for a reaper and binder, having a bar with a table, a rotary shaft with gleaners secured thereto, bearing-pieces for the hubs of said gleaners, a clamping device, an inclined track, and a rotating frame with arms pivoted thereto and adapted to ride on said track, said parts being combined substantially as described.

EDWIN F. TAYLOR.

Witnesses:
JOHN A. WIEDERSHEIM,
A. P. JENNINGS.